(12) United States Patent
Januschevski et al.

(10) Patent No.: US 9,000,717 B2
(45) Date of Patent: Apr. 7, 2015

(54) ELECTRICAL CHARGING SYSTEM

(75) Inventors: Robert Januschevski, Tettnang (DE);
Jurgen Kett, Mannheim (DE)

(73) Assignee: ZF Friedrichshafen AG,
Friedrichshafen (DE)

( * ) Notice: Subject to any disclaimer, the term of this patent is extended or adjusted under 35 U.S.C. 154(b) by 411 days.

(21) Appl. No.: 13/469,309

(22) Filed: May 11, 2012

(65) Prior Publication Data

US 2012/0299535 A1    Nov. 29, 2012

(30) Foreign Application Priority Data

May 27, 2011 (DE) .......................... 10 2011 076 601

(51) Int. Cl.
| | |
|---|---|
| H02J 7/00 | (2006.01) |
| H02J 7/14 | (2006.01) |
| B60L 11/18 | (2006.01) |
| H02J 7/02 | (2006.01) |

(52) U.S. Cl.
CPC ......... B60L 11/1803 (2013.01); B60L 11/1814 (2013.01); B60L 11/1816 (2013.01); H02J 7/022 (2013.01); H02J 7/1469 (2013.01); *B60L 2210/12* (2013.01); *B60L 2210/14* (2013.01); *B60L 2210/30* (2013.01); *B60L 2210/40* (2013.01); *B60L 2220/54* (2013.01); *Y02T 10/7088* (2013.01); *Y02T 10/7005* (2013.01); *Y02T 10/7241* (2013.01); *Y02T 10/7233* (2013.01); *Y02T 10/7225* (2013.01); *Y02T 10/641* (2013.01); *Y02T 90/121* (2013.01); *Y02T 90/14* (2013.01); *Y02T 90/127* (2013.01)

(58) Field of Classification Search
USPC .......................................................... 320/104
See application file for complete search history.

(56) References Cited

U.S. PATENT DOCUMENTS

| | | | |
|---|---|---|---|
| 5,629,603 A | | 5/1997 | Kinoshita |
| 5,952,812 A | * | 9/1999 | Maeda .......................... 318/803 |

FOREIGN PATENT DOCUMENTS

| | | |
|---|---|---|
| DE | 41 07 391 A1 | 9/1992 |
| DE | 693 03 150 T2 | 2/1997 |
| DE | 10 2009 028 959 A1 | 3/2011 |
| DE | 10 2009 052 680 A1 | 5/2011 |
| EP | 0 834 977 A2 | 4/1998 |

* cited by examiner

*Primary Examiner* — Eric Lee
(74) *Attorney, Agent, or Firm* — Davis & Bujold, PLLC; Michael J. Bujold

(57) ABSTRACT

An electrical charging system having a rectifier which is supplied with energy via an input. An inverter whose alternating voltage side is connected, via phase conductors, to windings of a rotating field machine and whose direct voltage side can be connected to an energy accumulator to be charged. A first current path section passes current, supplied by the rectifier, into the charging system via the plus terminal or pole of the rectifier and the rotating field machine to the inverter. The first current path section passes the current via phase windings of the rotating field machine, such that the first current path section comprises a first switch, which can selectively interrupt the first current path section. The charging system can operate, by the first switch and at least one phase winding in the first current path section, as a step-up and step-down converter in the direction toward an energy accumulator.

19 Claims, 2 Drawing Sheets

ELECTRICAL CHARGING SYSTEM

This application claims priority from German patent application serial no. 10 2011 076 601.4 filed May 27, 2011.

FIELD OF THE INVENTION

The present invention concerns an electrical charging system.

BACKGROUND OF THE INVENTION

A device of this type for charging an accumulator by means of the on-board electro-drive infrastructure of a motor vehicle via a rectifier is known from the document EP 0 834 977 A2, such that by virtue of the phase inductances of the star-connected electric machine a step-up converter is formed with advantageously little cost and effort.

However, the disadvantage of this known arrangement is that the proposed device does not provide farther-reaching charging possibilities for an electrical energy accumulator of a motor vehicle.

SUMMARY OF THE INVENTION

Starting from there, the purpose of the present invention is to propose a charging system for a motor vehicle, which by means of the on-board electro-drive structure enables farther-reaching charging possibilities with little structural effort and financial outlay.

According to the invention, an electrical charging system is proposed for a motor vehicle, in particular a motor vehicle with an electric drive structure, such as a hybridized motor vehicle with an electric drive machine or such as an electric vehicle.

The charging system comprises a rectifier to which energy can be supplied, via an input, from an external supply grid. The external supply grid can be for example a 230-V alternating voltage grid or a 400-V three-phase grid.

Preferably the rectifier is a bridge rectifier, in particular a rectifier which can act as a single-phase or three-phase full bridge. Such a rectifier, that can be formed by means of diodes, can advantageously rectify both alternating voltage and three-phase voltage, or can be supplied from corresponding grids and can provide direct voltage or rectified current at an output.

Preferably, in this case the charging system is made such that a supply input thereof is designed both for connection to an alternating current grid and also to a three-phase current grid, so that via the supply input the corresponding energy can be supplied to the rectifier. Advantageously, the supply input can be designed to enable switching between various connection devices, for example between a three-phase and an alternating current plug socket. Alternatively, the supply input can be designed for example only for connection to a three-phase grid or only for connection to an external alternating voltage grid.

The electrical charging system also comprises an inverter, provided in particular as a drive inverter in a motor vehicle. The inverter preferably comprises a B6 bridge circuit in each of whose half-bridges are arranged two power switches together with associated freewheel diodes. The power stage formed in this way, which constitutes an alternating voltage side of the inverter, can be controlled by a driver circuit.

On a direct voltage side of the inverter, the inverter comprises in particular an intermediate circuit condenser. On its direct voltage side, the inverter is provided for connection to an electrical energy accumulator, in particular via the intermediate circuit condenser, which electrical energy accumulator is to be charged by the charging system. Such an electrical energy accumulator can be an accumulator, a Super-Cap, a high-power battery, or some other electrical energy accumulator, in particular of an electrical drive-train of a motor vehicle, preferably a traction battery.

On the alternating current side, the inverter is electrically connected, by way of connecting lines or phase lines, to phase windings of a rotating field machine of the charging system, preferably in each case via a central tap of the half-bridges. In this case the rotating field machine is in particular an electric drive machine, for example an asynchronous machine or a synchronous machine, in particular of a motor vehicle. For charging operation by means of the charging system the rotating field machine is always static.

According to the invention, the charging system is advantageously designed to be able to act as a step-up converter and as a step-down converter in the direction toward an electrical energy accumulator. For this, in the charging system a first current path section is formed as part of a current path leading from the output-side plus pole to the output-side minus pole of the rectifier, which leads the current supplied or delivered by the rectifier for charging operation of the charging system via the output-side plus pole of the rectifier and the rotating field machine to the inverter. In this case the first current path section is designed such that the current along the first current path section is forced to pass through phase windings of the rotating field machine.

In the context of the present invention, the first current path section in this case comprises a first switch, in particular a controllable switch, by means of which the first current path section can be selectively interrupted, i.e. electrically. In this case it is provided that the first current path section passes via the switching path of the first switch. Such a first switch is preferably a controllable power switch, for example a transistorized switch such as an IGBT or a MOSFET. The first switch can preferably be part of the rectifier, whereas the diode bridge can be made with a thyristor or IGBT. Alternatively the first switch can for example be made separately, or can for example be a mechanical switch.

Here, it is provided in particular that the first current path section in the direction from the rectifier to the rotating field machine can be interrupted selectively by the first switch before the rotating field machine, and in particular the first switch can be operated cyclically.

In the context of the proposed charging system, the rotating field machine can be connected both in the star and the triangle mode. When the rotating field machine is connected in star mode it is provided to connect a first part of the first current path section via the first switch to a star point of the rotating field machine. The rectified current for the charging operation is thus made to pass through the phase windings of the rotating field machine so that their phase inductances can advantageously be used for step-up converter or step-down converter operation.

For a rotating field machine connected in triangle mode and also in star mode, in the context of the present invention it is also proposed that a first part of the first current path section of the charging system leads via the first switch to the rotating field machine, while a second switch is arranged in a phase conductor from the rotating field machine to the rectifier. Here, the second switch is provided in order to interrupt the phase conductor selectively so as to make the current pass along the first current path section through phase windings of the rotating field machine to the rectifier. In this case the second switch prevents the rectified current, already at a connection or feed point of the first current path section with or into the rotating field machine, at or near which in particular the phase conductor to be interrupted by the second switch branches off, from flowing in the phase conductor without being forced to pass through the rotating field machine or its windings.

In this case a second part of the first current path section leads through at least one winding of the rotating field machine and at least one phase conductor, in particular two phase conductors, to the inverter. A second current path section of the current path can also be or is formed through the inverter and the electrical energy accumulator to the minus pole of the rectifier.

The second switch is preferably also a controllable power switch, for example a transistorized switch such as an IGBT or a MOSFET. Alternatively, the first switch can for example be made separate or can for example be a mechanical switch.

In particular for step-down converter operation, the charging system comprises a diode which enables discharging of the step-down converter that corresponds to a reduction of the energy stored in the windings of the rotating field machine. As viewed in the direction from the output-side plus pole to the minus pole of the rectifier, the diode is electrically connected upstream from the rotating field machine by way of the first switch, i.e. downstream thereof, in the first current path section to the plus pole of the rectifier, and on the other side to the minus pole of the rectifier. Here, the blocking direction of the diode is from the plus pole toward the minus pole of the diode.

In the context of the present invention the charging system is designed, by means of the first or the first and the second switch, the diode, and at least one winding and the inverter, in particular its intermediate circuit condenser, to form a step-down converter. For this the first switch is operated cyclically in accordance with the step-down converter principle, and the current passing through the rectifier is if necessary made by the second switch to flow through at least one winding, so that using the inductance of the winding it can be charged and discharged for the step-down converter charging operating. By virtue of the diode the current can circulate in the charging system. During this the inverter can loop the current through via the freewheel diodes of the power switch to the direct voltage side. By means of the cycling of the first switch, i.e. the keying ratio, the voltage for the charging operation can be adjusted.

In the context of the present invention the charging system is also designed to form a step-up converter by means of at least one winding, the first or the first and the second switch and the inverter, in particular its intermediate circuit condenser. In this case the first switch is permanently closed and the rectified current is made to pass along the first current path section through at least one phase winding, and the winding, by virtue of its winding inductance and at least one through-connected power switch of the inverter, can be charged. For discharging, the at least one through-connected power switch is opened, i.e. made non-conducting, and the charging current can now flow via the freewheel diodes to an electrical energy accumulator to be charged on the direct voltage side of the inverter. In this case the charging voltage can be increased relative to the rectified voltage in accordance with the step-up converter principle.

In an advantageously inexpensive way the charging system so formed can act as a step-up converter or as a step-down converter in the direction toward an electrical energy accumulator by virtue of the first switch and at least one winding in the first current path section.

Further features and advantages of the invention emerge from the following description of example embodiments thereof, given with reference to the figures in the drawings, which show details essential to the invention, and from the claims. The individual features can be realized in isolation as such, or more than one at a time in any desired combination in a variant of the invention.

BRIEF DESCRIPTION OF THE DRAWINGS

Below, example embodiments of the invention are explained in more detail with reference to the attached drawings, which show.

DETAILED DESCRIPTION OF THE PREFERRED EMBODIMENTS

Figure 1:
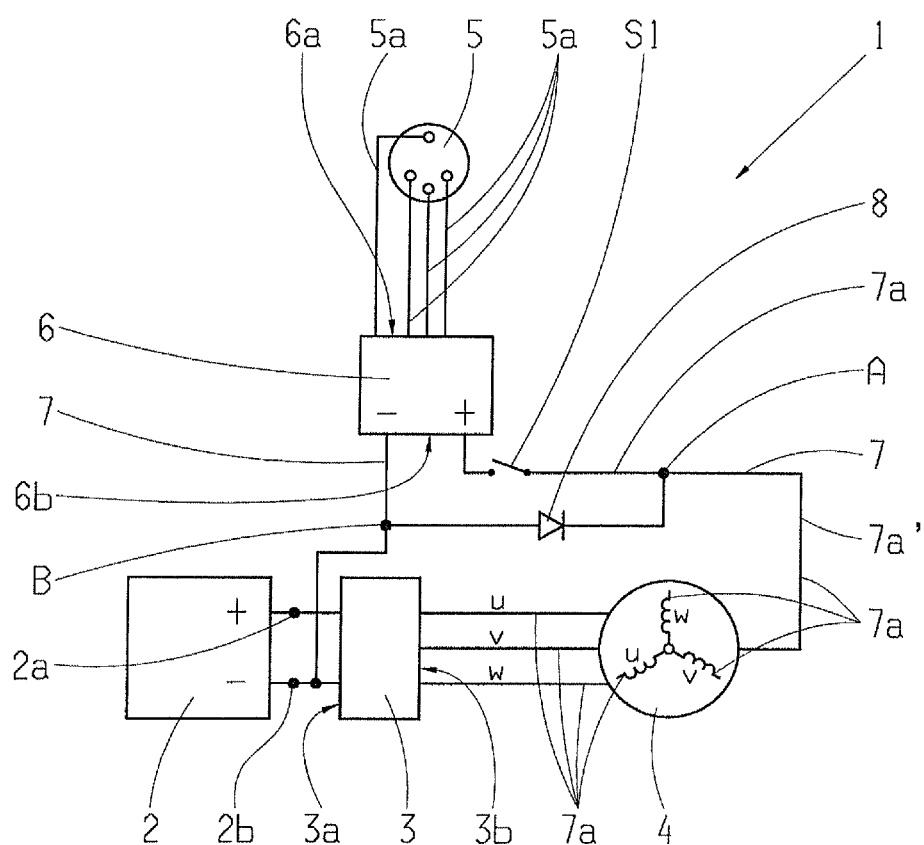
FIG. 1: An example of a charging system with a first switch and a rotating field machine connected in star mode, according to a possible embodiment of the invention.

FIG. 1 shows a charging system 1 for charging an electrical energy accumulator 2 arranged on the direct voltage side 3a of an inverter 3 of the charging system 1 and electrically connected thereto. An intermediate circuit condenser of the inverter 3 is in this case connected in parallel to the connection terminals 2a, b of the electrical energy accumulator 2. On its alternating voltage side 3b the drive inverter 3 is connected by phase conductors u, v, w to the phase windings U, V, W of a star-connected rotating field machine 4, the phase windings U, V, W being connected electrically to central taps of the half-bridges of the inverter 3.

The charging system 1 also comprises a supply input 5 provided for connecting to an external energy supply grid. The supply input 5 is connected by connecting lines 5a to the input 6a of a rectifier 6 of the charging system 1 for the supply of electrical energy to it. The rectifier 6 is designed to work as a single-phase or three-phase rectifier 6 and to deliver a rectified voltage or a rectified current on its output side, which are available at the output 6b of the rectifier 6 or from its plus pole and minus pole.

As can be seen from FIG. 1, a first current path section 7a for passing rectified current, i.e. current supplied by the rectifier 6, is formed in the charging system 1 from the plus pole of the rectifier 6 and the rotating field machine 4 to the inverter 3, which necessarily passes the current via phase windings U, V, W of the rotating field machine 4. The current path section 7a, which is part of a current path 7 from the plus pole of the rectifier 6 to the minus pole of the rectifier 6 by way of the charging system 1 and the electrical energy accumulator 2 connected thereto, leads in this case via a star a point of the phase windings U, V, W so that the first current path section 7a branches downstream from the star point to the phase windings U, V, W and the phase conductors u, v, w connected to them. Thus, as intended, the phase inductances and in particular all of them are available for charging operation of the charging system 1.

In the first current path section 7a, in the direction from the rectifier 6 to the rotating field machine 4 before or upstream from the latter, is arranged a first switch S1 by means of which the first current path section 7a can be selectively interrupted. The first switch S1 is in the form of a transistorized, controllable power switch along whose switching path the current path 7 or its first current path section 7a leads. When the switch S1 is actuated to be open the current path section 7a is interrupted, and when the switch S1 is closed the current path section conducts.

Using the phase inductances, the charging voltage can be adjusted appropriately for a charging operation for charging the electrical energy accumulator 2 on the direct voltage side 3a by means of the inverter 3 in accordance with the step-up converter or step-down converter principle, so that an intended current for charging the electrical energy accumulator 2 by means of the current supplied by the rectifier 6 via the phase conductors u, v, w to the inverter 3 can be set.

A charging current can flow into the electrical energy accumulator 2 by way of the connection terminals 2a, 2b connected to the inverter 3, its minus pole being connected to the minus pole of the rectifier 6 so that a closed current path 7 or current circuit can be formed during a charging operation by the charging system 1 and the electrical energy accumulator 2. For step-down converter operation the charging system 1 in this case comprises a diode 8 which, on the one hand via a first tap A located in the first current path section 7a upstream from the rotating field machine 4 and downstream from the first switch S1, can be electrically connected to the plus pole of the rectifier 6 depending on the switch position of the switch S1, i.e. selectively, and on the other hand is electrically connected via a second tap B in the current path 7 directly to the minus pole of the rectifier 6. Here, the blocking direction of the diode 8 is from the first tap A toward the second tap B. By virtue of the diode 8, during step-down converter operation the current can circulate when the switch S1 is open.

Figure 2:
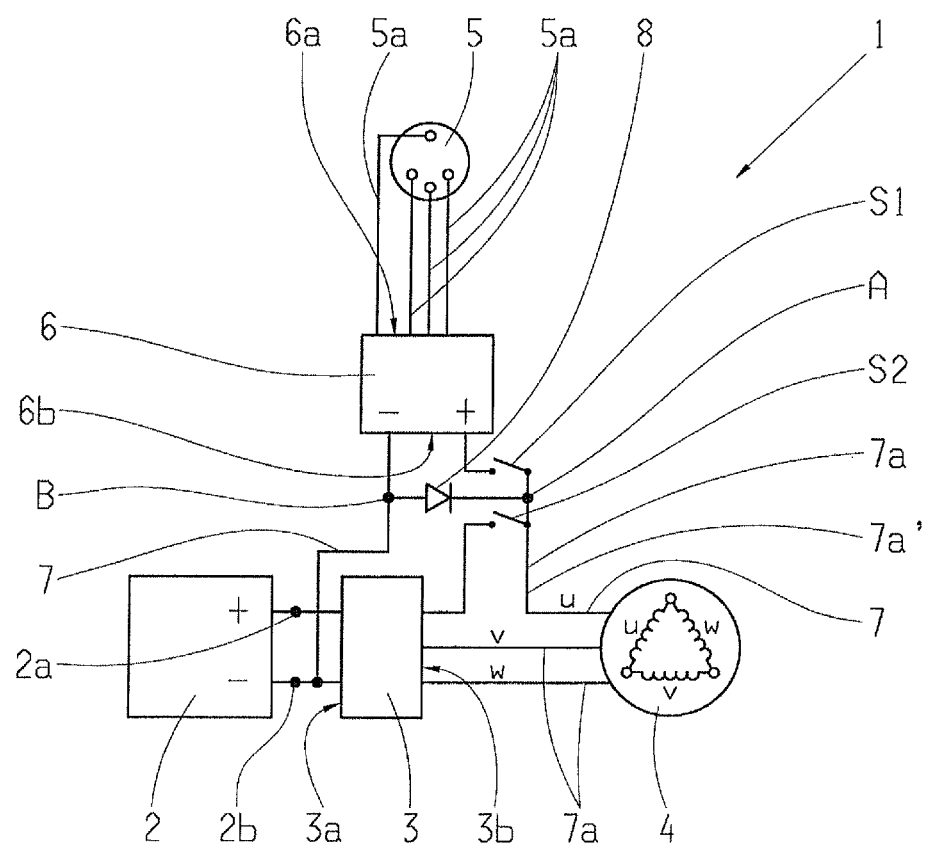
FIG. 2: An example of a charging system with a first and a second switch and a rotating field machine connected in triangle mode, according to another possible embodiment of the invention.

FIG. 2 shows an embodiment of the charging system 1 which is suitable for charging operation in combination with a rotating field machine 4 configured both in star-connected and in triangle-connected mode. In the case illustrated the rotating field machine 4 is of triangle-connected design. The rectified current is here fed into the rotating field machine 4 by way of the first current path section 7a, via a first connection terminal of the rotating field machine 4 which is connected to the phase conductor u.

As a further difference from the embodiment according to FIG. 1, the charging system 1 in FIG. 2 has a second switch S2 whose purpose is to cause the current supplied by the rectifier 6 to flow by way of phase windings U, V, W of the rotating field machine 4. In this case the second switch S2 is provided in order to selectively interrupt during charging operation the phase conductor u by way of which the current to the inverter 3 supplied at the connection terminal of the rotating field machine 4 which is connected to the phase conductor u could otherwise bypass the windings U, V, W of the rotating field machine.

The switching path of the second switch S2 is in this case in the phase conductor u, so that the phase conductor u is interrupted when the switch S2 is open but conducts when the switch S2 is closed. In other words, the switch S2 is arranged in the phase conductor u. As already indicated earlier, here the phase conductor u is connected for electric conduction with the feed point into the rotating field machine 4, and thus branches off from a first part 7a of the first current path section downstream from the switch S1, which leads from the rectifier 6 to the feed point into the rotating field machine 4.

By virtue of this charging system arrangement, which can be produced with little effort and expense, and which in other respects corresponds to the embodiment according to FIG. 1 described earlier, the charging system 1, which can be formed by a star- or triangle-connected rotating field machine 4, can be operated in a step-up converter or in a step-down converter charging mode as described earlier.

INDEXES

1 Charging system
2 Energy accumulator
2a, b Connection terminals of 2
3 Drive inverter
3a Direct voltage side of 3
3b Alternating voltage side of 3
4 Rotating field machine
5 Supply connection
5a Connection lines
6 Rectifier
6a Input of 6
6b Output of 6
7 Current path
7a First current path section
7a' First part of 7a
8 Diode
u, v, w Phase conductors
U, V, W Phase windings
A, B Tap
S1 First switch
S2 Second switch

The invention claimed is:

1. An electrical charging system (1) for a motor vehicle, the charging system (1) comprising:
a rectifier (6) to which energy is supplied at an input (6a) from an external supply grid,
the charging system (1) also comprising an inverter (3) whose alternating voltage side (3b) is electrically connected, via phase conductors (u, v, w), to phase windings (U, V, W) of a rotating field machine (4) and whose direct voltage side (3a) is electrically connectable to an electrical energy accumulator (2) to be charged,
a first current path section (7a) being formed for passing current supplied by the rectifier (6) into the charging system (1) by way of a plus terminal of the rectifier (6) and the rotating field machine (4) to the inverter (3), and the first current path section (7a) causing the current to pass, via the phase windings (U, V, W) of the rotating field machine (4), and the first current path section (7a) comprising a first switch (S1) by which the first current path section (7a) is selectively interruptable,
a minus terminal of the electrical energy accumulator (2) being electrically connected to a minus terminal of the rectifier (6) via an electrical pathway that bypasses the inverter (3), and
the charging system (1) being designed such that by virtue of the first switch (S1) and at least one of the phase windings (U, V, W) in the first current path section (7a), the charging system (1) being operable as a step-up converter and also as a step-down converter in a direction toward the electrical energy accumulator (2).

2. The charging system (1) according to claim 1, wherein in a direction from the rectifier (6) toward the rotating field machine (4), the first current path section (7a) is selectively interruptable by the first switch (S1) located before the rotating field machine (4).

3. The charging system (1) according to claim 1, wherein a first part (7a') of the first current path section (7a) extends, via the first switch (S1), to a star point of the rotating field machine (4) connected in a star configuration.

4. The charging system (1) according to claim 1, wherein a first part (7a') of the first current path section (7a) of the charging system (1) extends, via the first switch (S1), to the rotating field machine (4), and a second switch (S2) is arranged in a phase conductor (u) from the rotating field machine (4) to the inverter (3), which is provided in order to selectively interrupt the phase conductor (u) in order to cause the current to pass along the first current path section (7a) through the phase windings (U, V, W) of the rotating field machine (4) to the inverter.

5. The charging system (1) according to claim 4, wherein a second part of the first current path section (7a) leads, through at least one of the phase windings (U, V, W) of the rotating field machine (4) and at least one phase conductor (v, w), to the inverter (3).

6. The charging system (1) according to claim 1, wherein the charging system (1) comprises a diode (8) which, in a direction from the rectifier (6) toward the rotating field machine (4), is electrically connected upstream from the rotating field machine (4) by the first switch (S1) to the plus terminal of the rectifier (6) and, on an other side, to the minus terminal of the rectifier (6), and a blocking direction of the diode (8) is from the plus terminal toward the minus terminal of the rectifier (6).

7. The charging system (1) according to claim 6, wherein the electrical pathway that bypasses the inverter (3) also bypasses both the diode (8) and the first switch (S1).

8. The charging system (1) according to claim 6, wherein the diode (8) directly electrically couples the first current path section (7a), at a location between the first switch and the rotating field machine (4), to the electrical pathway that bypasses the inverter (3).

9. The charging system (1) according to claim 1, wherein the charging system (1) is designed, by either the first switch (S1) or the first switch (S1) and a second switch (S2), the diode (8) and at least one of the phase windings (U, V, W) and the inverter (3), to form a step-down converter.

10. The charging system (1) according to claim 1, wherein the charging system (1) is designed, by at least one of the phase windings (U, V, W), either the first switch (S1) or the first switch (S1) and a second switch (S2), and the inverter (3), to form a step-up converter.

11. The charging system (1) according to claim 1, wherein the charging system (1) comprises a supply input (5) by way of which energy, from the external supply grid, is supplied to the rectifier (6).

12. The charging system (1) according to claim 11, wherein the supply input (5) is switchable between three-phase and alternating current.

13. The charging system (1) according to claim 1, wherein the rectifier (6) is designed to operate as either a single-phase or a three-phase rectifier (6).

14. The charging system (1) according to claim 11, wherein the first switch (S1) is part of the rectifier (6).

15. The charging system (1) according to claim 1, wherein the electrical pathway that bypasses the inverter (3) also bypasses the rotating field machine (4).

16. The charging system (1) according to claim 1, wherein the electrical energy accumulator (2) is directly electrically connected to the rectifier (6).

17. The charging system (1) according to claim 1, wherein the rectifier (6) is directly supplied with energy from the external supply grid via the input (6a) along a second electrical pathway that bypasses the inverter (3), the phase windings (U, V, W) and the rotating field machine (4).

18. The charging system (1) according to claim 1, wherein the rectifier (6) electrically couples the rotating field machine (4) to the external supply grid.

19. A motor vehicle in combination with an electrical charging system (1) comprising:
    a rectifier (6) to which energy being supplied from an external supply grid to an input (6a),
    the charging system (1) also comprising an inverter (3) whose alternating voltage side (3b) is electrically connected via phase conductors (u, v, w) to phase windings (U, V, W) of a rotating field machine (4) and whose direct voltage side (3a) being electrically connectable to an electrical energy accumulator (2) to be charged,
    a first current path section (7a) being formed for passing current supplied by the rectifier (6) into the charging system (1) by way of a plus pole of the rectifier (6) and the rotating field machine (4) to the inverter (3), and the first current path section (7a) causing the current to pass via the phase windings (U, V, W) of the rotating field machine (4),
    a minus terminal of the electrical energy accumulator (2) being electrically connected to a minus terminal of the rectifier (6) via an electrical pathway that bypasses both the inverter (3) and the rotating field machine (4),
    the first current path section (7a) comprising a first switch (S1), by which the first current path section (7a) being selectively interruptable, and
    the charging system (1) being designed such that by virtue of the first switch (S1) and at least one of the phase windings (U, V, W) in the first current path section (7a), the charging system (1) being operable as a step-up converter and also as a step-down converter in a direction toward the electrical energy accumulator (2).

* * * * *